United States Patent [19]

Feicht et al.

[11] 3,899,777

[45] Aug. 12, 1975

[54] MEANS FOR EQUALIZING LINE POTENTIAL WHEN THE CONNECTING SWITCH IS OPEN

[75] Inventors: Erwin Feicht, Berlin; Werner Otto Haug, Boeblingen; Rolf Remshardt, Boeblingen; Helmut Schettler, Boeblingen, all of Germany

[73] Assignee: International Business Machines Corporation, Armonk, N.Y.

[22] Filed: Feb. 25, 1974

[21] Appl. No.: 446,033

[30] Foreign Application Priority Data

Feb. 23, 1973 Germany ............................ 2309186

[52] U.S. Cl. ....... 340/173 R; 307/238; 340/174 DA; 340/174 DC

[51] Int. Cl.[2] ............................................ G11C 7/06

[58] Field of Search .... 340/173 R, 173 CA, 173 FF, 340/174 DA, 174 DC; 307/238

[56] References Cited

UNITED STATES PATENTS

| | | | |
|---|---|---|---|
| 3,774,176 | 11/1973 | Stein et al. | 340/173 FF |
| 3,786,442 | 1/1974 | Alexander et al. | 340/173 R |

*Primary Examiner*—Stuart N. Hecker
*Attorney, Agent, or Firm*—Theodore E. Galanthay

[57] ABSTRACT

In a monolithic semiconductor storage the bit lines are selectively connected in pairs to the inputs of a read amplifier. In their separated state the potentials of the read lines ($V_B$) and of the associated input lines of the read amplifier ($V_{BS1}$, $V_{BS2}$) show the same value and are derived from a common potential ($V_H$). Potentials $V_B$ as well as $V_{BS1}$ and $V_{BS2}$ are derived via the same respective number of diode voltage drops from potential $V_H$.

5 Claims, 2 Drawing Figures

MEANS FOR EQUALIZING LINE POTENTIAL WHEN THE CONNECTING SWITCH IS OPEN

BACKGROUND OF THE INVENTION

1. Field of the Invention

The invention relates to a storage arrangement with several separate read lines which can be selectively connected, severally or in pairs, to a read amplifier.

2. Description of the Prior Art

In semiconductor memories, the individual memory cells are generally arranged in matrix form. In word-organized memories, the row lines normally are the word lines whereas the column lines represent the bit lines. The bit lines are also used as read lines. For each column of a storage matrix one read line, or one pair of read lines respectively, is therefore obtained. As one storage matrix, or even a plurality of storage matrices, have only one associated read amplifier only that pair of read lines which is connected to a memory cell to be read can be connected to the input of the read amplifier during a reading process. For selecting the respective pair of read lines switches have therefore to be provided between the individual read lines and the read amplifier, only the switches which are associated to one repsective pair of read lines being conductive during a read process. The read lines and the input lines of the read amplifier are to be brought to the same potentials upon non-conductive switches. The capacities of these separate lines, however, are charged by different voltage sources. Due to variations of the supply voltages applied, and to the tolerances of the individual components it can, however, scarcely be avoided that the potentials of the read amplifier and of the read lines differ from each other. Upon the combination of a read line pair and the amplifier input lines therefore capacitive balancing currents are at first encountered owing to the differing potentials. As the read amplifier is generally designed as a differential amplifier these balancing currents have no disturbing influence provided the capacities of the two line branches associated to the amplifier inputs correspond to each other. However, asymmetries of the line capacities which cannot be avoided cause differing balancing currents in the two branches of the line, so that a differential current independent of the actual read signal flows at the inputs of the read amplifier at the beginning of a read process. Consequently, all balancing currents have to disappear before the actual signal can be read. The access time of the storage is therefore extended by the period required for the balancing operations.

SUMMARY OF THE INVENTION

It is thus the object of the present invention to provide a storage arrangement with read lines which can be connected via switches to the inputs of a read amplifier, said storage arrangement achieving a reduction of the reading process and thus of the access time. In the above-specified storage arrangement this object is reached, according to the invention, in that the potentials of the read lines and of the associated input lines of the read amplifier show in the separate state the same value and are derived from the same potential. Preferably, the potentials of the read lines and of the input lines of the read amplifier are derived from the common potential via corresponding components of an integrated semiconductor arrangement. The potentials of the read lines and of the input lines of the read amplifier are advantageously derived from the common potential via components causing diode voltage drops.

The foregoing and other objects, features, and advantages of this invention will be apparent from the following and more particular description of the preferred embodiments as illustrated in the accompanying drawings.

DESCRIPTION OF THE PREFERRED EMBODIMENTS

Figure 1:
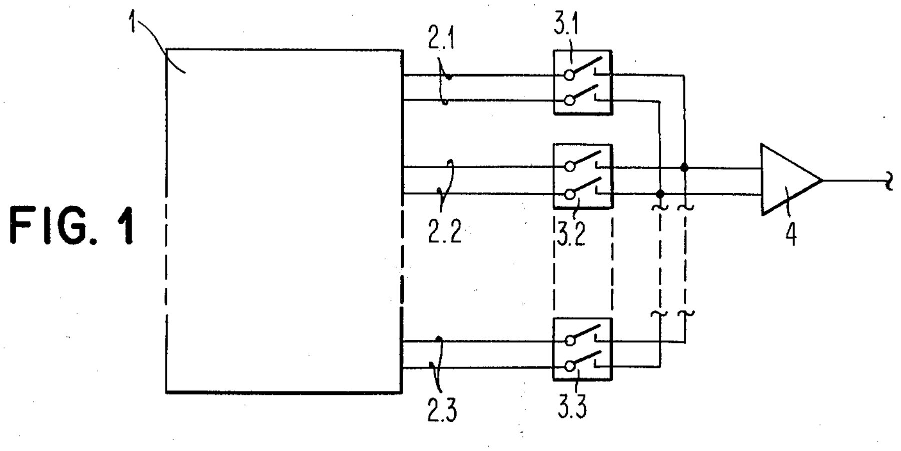
FIG. 1 shows the basic wiring diagram of a storage arrangement with a storage matrix and a read amplifier.

FIG. 1 shows a storage matrix 1 known per se in block representation which shows a large number of read line pairs. For the convenience of illustration FIG. 1 presents only the three read line pairs 2.1, 2.2, and 2.3. One of the switches 3.1, 3.2, and 3.3 is connected to each read line pair. The read line ends separated from the storage matrix by the switches are combined to form a pair of input lines of read amplifier 4. Thus, each pair of read lines can be selectively connected to the inputs of the read amplifier simply by activating the associated switch.

Figure 2:
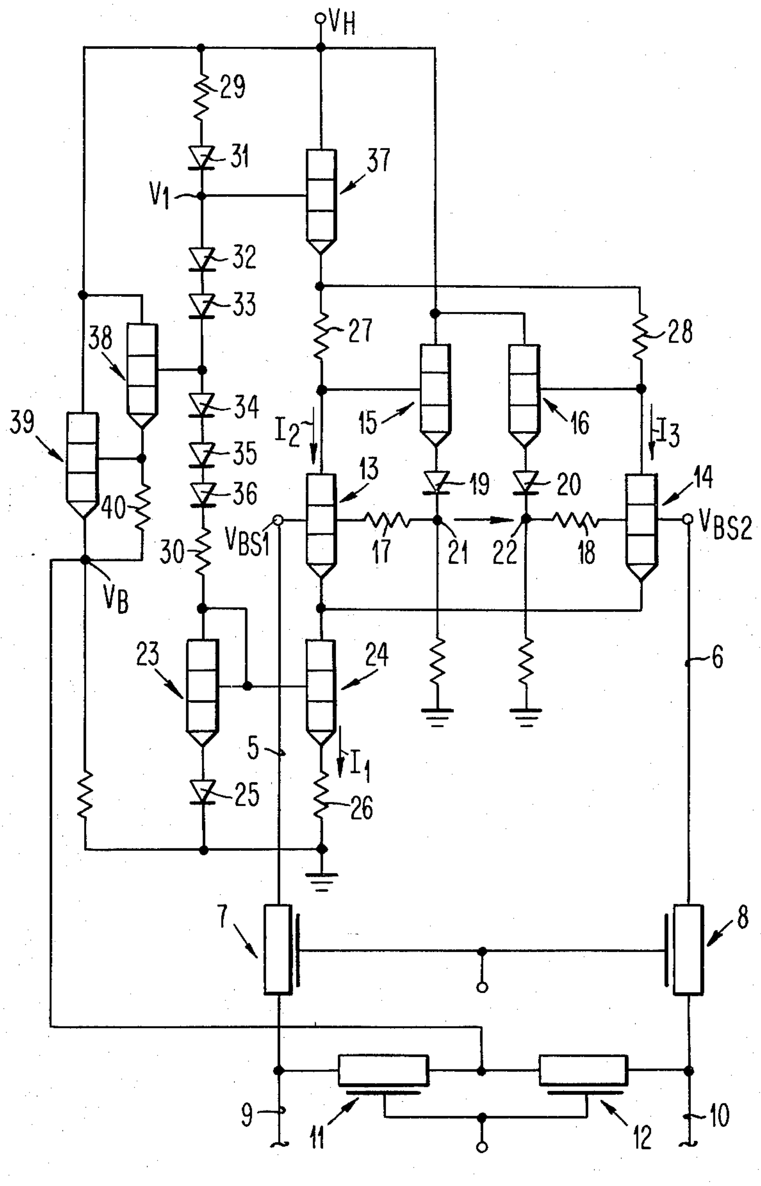
FIG. 2 shows the wiring diagram of a read amplifier and and arrangement for generating the potentials for the read lines and the amplifier input lines.

FIG. 2 shows a circuit arrangement by means of which the respective separate line parts arranged on both sides of the non-conductive switches 3.1, 3.2, and 3.3 in FIG. 1 are brought on the same potential. Furthermore, FIG. 2 illustrates the structure of the read amplifier structure. Lines 5 and 6 represent the input lines of the read amplifier. The potential on these lines is marked $V_{BS1}$ and $V_{BS2}$. Into lines 5 and 6 field effect transistors 7 and 8 are installed which correspond to one of switches 3.1, 3.2, or 3.3 in FIG. 1. By means of a suitable pulse applied to the gate electrodes of field effect transistors 7 and 8 these can be made conductive. Lines 9 and 10 of FIG. 2 correspond to one of read line pairs 2.1, 2.2, or 2.3 in FIG. 1. Field effect transistors 11 and 12, owing to a suitable potential at these gate electrodes, are normally highly conductive so that potential $V_B$ generated in the circuit shown is transmitted to these lines. Field effect transistors 11 and 12 are rendered non-conductive when field effect transistors 7 and 8 are brought into their conductive state.

The read amplifier contains a differential amplifier formed by transistors 13 and 14 and controlled by the input signals, and two emitter followers 15 and 16, and feedback resistors 17 and 18. Diodes 19 and 20 serve for increasing the dynamic range of the amplifier for noise signals on both inputs. Between points 21 and 22 the output voltage of the read amplifier is taken off.

The arrangement consisting of transistors 23 and 24, diode 25, and resistor 26 is provided as the current source for the differential amplifier. Current $I_1$ flowing via transistor 24 adjusts itself in such a manner that a base-emitter voltage ($V_{BE}$) drops at resistor 26. This state is caused by diode 25 arranged in parallel to resistor 26. In the signal-free state, i.e. upon $V_{BS1} = V_{BS2}$, the current branches off into two equal currents $I_2$ and $I_3$ flowing via one respective of transistors 13 and 14. Each of the two resistors 27 and 28 has a value twice as high as resistor 26. Thus, the voltage drop at these resistors equally corresponds to a voltage dropping at a base-emitter junction, or a diode, respectively. Resistors 17 and 18 are dimensioned in such a manner that the voltage drop there is negligible. The generation of potentials $V_{BS1}$, $V_{BS2}$ in the signal-free state is executed by means of a voltage divider consisting of resistors 29,30, diodes 25,31,32,33,34,35, and 36, and transistors 23. This voltage divider is provided between the applied potential $V_H$ and ground potential.

Starting from potential $V_1$ at the base of transistor 37, the following is obtained for potential $V_{BS1}$:

$$V_{BS1} = V_1 - V_{BE(37)} - V_{BE(20)} - V_{BE(15)} - V_{BE(19)} = V_1 - 4 \times V_{BE}$$

This relation is obtained in that at resistor 27 there is a voltage which corresponds to the voltage drop $V_{BE}$ at a base-emitter junction, or a diode, and that the voltage drop at resistor 17 is very much lower than a diode voltage drop, and thus negligible. For generating potential $V_{BS2}$ there applies the corresponding consideration, i.e. there also applies $V_{BS2} = V_1 - 4 \times V_{BE}$ Potential $V_B$ is lower by the voltages at diodes 32 and 33, and at the base-emitter paths of transistors 38 and 39, than potential $V_1$ at the base of transistor 37. Therefore, here, too, there applies: $V_B = V_1 - 4 \times V_{BE}$ It is thus made sure that the read lines of the storage and the input lines of the associated read amplifier show the same potential when they are separated from each other, and that upon the connection of these lines there are no balancing currents. For that reason, the reading process can be performed without delays, so that the access time can be considerably reduced.

As the circuit arrangement illustrated in FIG. 2 is preferably designed in integrated technology, manufacture-originating variations of the electric characteristics have the same effect on all corresponding components. An increase or decrease of voltage $V_{BE}$ relative to the given mean value occurs simultaneously for all diodes and transistors so that potentials $V_B$, $V_{BS1}$, and $V_{BS2}$, although differing from their given value, do not differ from each other. Resistors 26, 27 and 28 of the individual circuit arrangements can differ relatively strongly from each other in their absolute value; but the ratios of the values of resistors 26 and 27 to that of resistor 28 supply relatively exact the desired value for a circuit arrangement. As owing to the parallel diode 25 voltage $V_{BE}$ is on resistor 26 at any rate the voltage drop at the two resistors 27 and 28 is sure to correspond with a relatively high precision to a diode voltage drop. The circuit arrangement in integrated technology thus ensures that potentials $V_B$, $V_{BS1}$, and $V_{BS2}$ correspond to each other with sufficient precision.

For the resistors of the circuit arrangement illustrated in FIG. 2, and for the potentials of that arrangement, there apply for instance the following values:

Resistors 17 and 18: 2.0 kOhm each
Resistor 26: 0.72 kOhm
Resistors 27 and 28: 1.44 kOhm each
Resistor 29: 1.9 kOhm
Resistor 30: 0.85 kOhm
Resistor 40: 2.0 kOhm
Potential $V_H$: 9.5 Volts
Potentials $V_B$, $V_{BS1}$, and $V_{BS2}$: 3.6 Volts each While the invention has been shown and particularly described with reference to preferred embodiments, it will be understood by those skilled in the art that various changes in form and detail may be made therein without departing from the spirit and scope of the invention.

What is claimed is:

1. Storage arrangement comprising:
a read amplifier having input lines;
a plurality of separate read lines each connectable separately or in pairs to the input lines of said read amplifier;
switch means connected between said input lines and said read lines; and
means connected between a source potential and both said input lines and said read lines for bringing both said input lines and said read lines to the same potential level when said switch means is open.

2. Storage arrangement as claimed in claim 1 wherein: the potentials of the read lines and the input lines of the read amplifier are derived from the source potential via corresponding components of an integrated semiconductor circuit arrangement.

3. Storage arrangement as claimed in claim 2 wherein: for achieving defined voltage drops at resistors arranged in series at least one of these resistors has a diode arranged in parallel thereto.

4. Storage arrangement as claimed in claim 2, wherein: the potentials of the read lines and the input lines of the read amplifier are derived from the source potential via components causing diode voltage drops.

5. Storage arrangement as claimed in claim 4 wherein: for achieving defined voltage drops at resistors arranged in series at least one of these resistors has a diode arranged in parallel thereto.

* * * * *